United States Patent [19]

Adalbert et al.

[11] 4,103,506

[45] Aug. 1, 1978

[54] METHOD AND ARRANGEMENT FOR CONTROLLING THE OPERATION OF A COOLING SYSTEM IN AN AUTOMOTIVE VEHICLE

[75] Inventors: Gerhard Adalbert, Campinas, Brazil; Jürgen Hess, Baden-Baden; Ulrich Hecht, Bühlertal, both of Fed. Rep. of Germany

[73] Assignee: Robert Bosch GmbH, Stuttgart, Fed. Rep. of Germany

[21] Appl. No.: 650,762

[22] Filed: Jan. 20, 1976

[30] Foreign Application Priority Data

Jan. 21, 1975 [DE] Fed. Rep. of Germany ....... 2502184

[51] Int. Cl.² .......................... B60H 3/04; F25B 1/00; F01C 11/00; F03C 3/00
[52] U.S. Cl. .......................................... 62/61; 62/133; 62/228; 62/230; 62/243; 62/323; 418/214
[58] Field of Search ............... 418/23, 14, 158, 214 X; 62/243, 323, 133, 228, 230, 61

[56] References Cited

U.S. PATENT DOCUMENTS

| 1,538,075 | 5/1925 | Wingquist | 418/23 |
|---|---|---|---|
| 1,603,437 | 10/1926 | Wingquist | 418/23 |
| 2,855,761 | 10/1958 | Jacobs | 62/243 |
| 3,062,020 | 11/1962 | Heidorn | 62/196 R |
| 3,241,332 | 3/1966 | Harlin | 62/323 |
| 3,365,906 | 1/1968 | Zadig | 62/323 |
| 3,828,569 | 8/1974 | Weisgerber | 62/243 |

Primary Examiner—Lloyd L. King
Attorney, Agent, or Firm—Michael J. Striker

[57] ABSTRACT

The cooling system includes a cyclically operating cooling-medium compressor driven by the vehicle engine. At low to medium engine speeds, corresponding to speeds from idling to city-driving speeds, the cooling system develops a cooling power sufficient to satisfactorily cool the interior of the passenger compartment. At higher engine speeds, corresponding to highway travel, the cooling power developed by the cooling system is automatically decreased by automatically decreasing the per-cycle volumetric throughput of the cooling-medium compressor. The automatic decrease is effected in automatic response to the reaching of a certain engine rpm or a certain condensation pressure in the condenser of the cooling system. In the illustrated embodiment, the compressor is a sliding-vane compressor, and the per-rotation volumetric throughput thereof is decreased by arresting certain ones of the vanes in the retracted position.

4 Claims, 5 Drawing Figures

METHOD AND ARRANGEMENT FOR CONTROLLING THE OPERATION OF A COOLING SYSTEM IN AN AUTOMOTIVE VEHICLE

BACKGROUND OF THE INVENTION

The invention relates to the control of cooling systems, particularly those used to cool the passenger compartments of automotive vehicles.

Still more particularly, the invention is concerned with cooling systems including a cooling-medium compressor which is driven by the vehicle engine in such a manner that, at low to middle speeds of the engine (corresponding to the range of speeds from idling to city-driving speed), the cooling power of the cooling system is sufficient to effect the desired degree of cooling.

Such cooling systems, particularly for example when used to cool the passenger compartment of an automotive vehicle, have the disadvantage that when the rpm of the vehicle engine driving the cooling-medium compressor reaches high values, such as during high-speed highway travel, the cooling power produced by the cooling system is too high. As a result, the pressure ratio of the cooling medium compressor increases, leading to a deterioration of the specific power of the system.

SUMMARY OF THE INVENTION

It is accordingly a general object of the invention to provide a method of so controlling the cooling power, as well as an apparatus for performing the method, that the cooling power of the cooling system is automatically adjusted in dependence upon changes in the operating condition of the vehicle engine.

According to one advantageous concept of the invention, at high rotary speeds of the engine, the cooling power of the cooling system is automatically decreased by automatically decreasing the per-rotation volumetric throughput of the cooling-medium compressor. This has the advantage that the pressure ratio at the compressor is reduced, as a result of which a deterioration of the specific power of the compressor is counteracted. The decrease of the per-rotation volumetric throughput can be performed virtually without any energy losses, and as a result the decrease of the volumetric throughput simultaneously serves to decrease the necessary drive power.

According to a preferred concept of the invention, the cooling-medium compressor employed is of the sliding-vane type. It includes a rotor mounted for rotation in a compressor housing. The rotor is provided with radially extending guide slits for sliding vanes. The radially outer edges of the sliding vanes slide along the inner surface of the compressor housing chamber, which acts as a control surface for the sliding vanes. The compressor housing chamber is elliptical and the rotor generally circular, so that the diametrally opposite working spaces left between them are generally crescent-shaped. Means are provided for locking the vanes in their retracted position in their guide slits. The method can be performed particularly well if at least one of the sliding vanes cannot be so locked.

If the cooling-medium compressor has $n$ working spaces arranged point-symmetrically with respect to each other or one another relative to the rotor rotation axis, and if the rotor is provided with a plurality of groups of sliding vanes, then to establish an equilibrium of all the gas forces exerted upon the rotor, each group of sliding vanes should consist of $n$ vanes likewise arranged point-symmetrically with respect to each other or one another relative to the rotor rotation axis. When the vanes are arranged in groups of $n$ vanes each, in this way, it has provided particularly advantageous to provide all the vanes of at least one group with means for arresting the vanes in their retracted positions, with all the vanes of at least one other group not being provided with such arresting means and thus being incapable of being arrested in their retracted positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
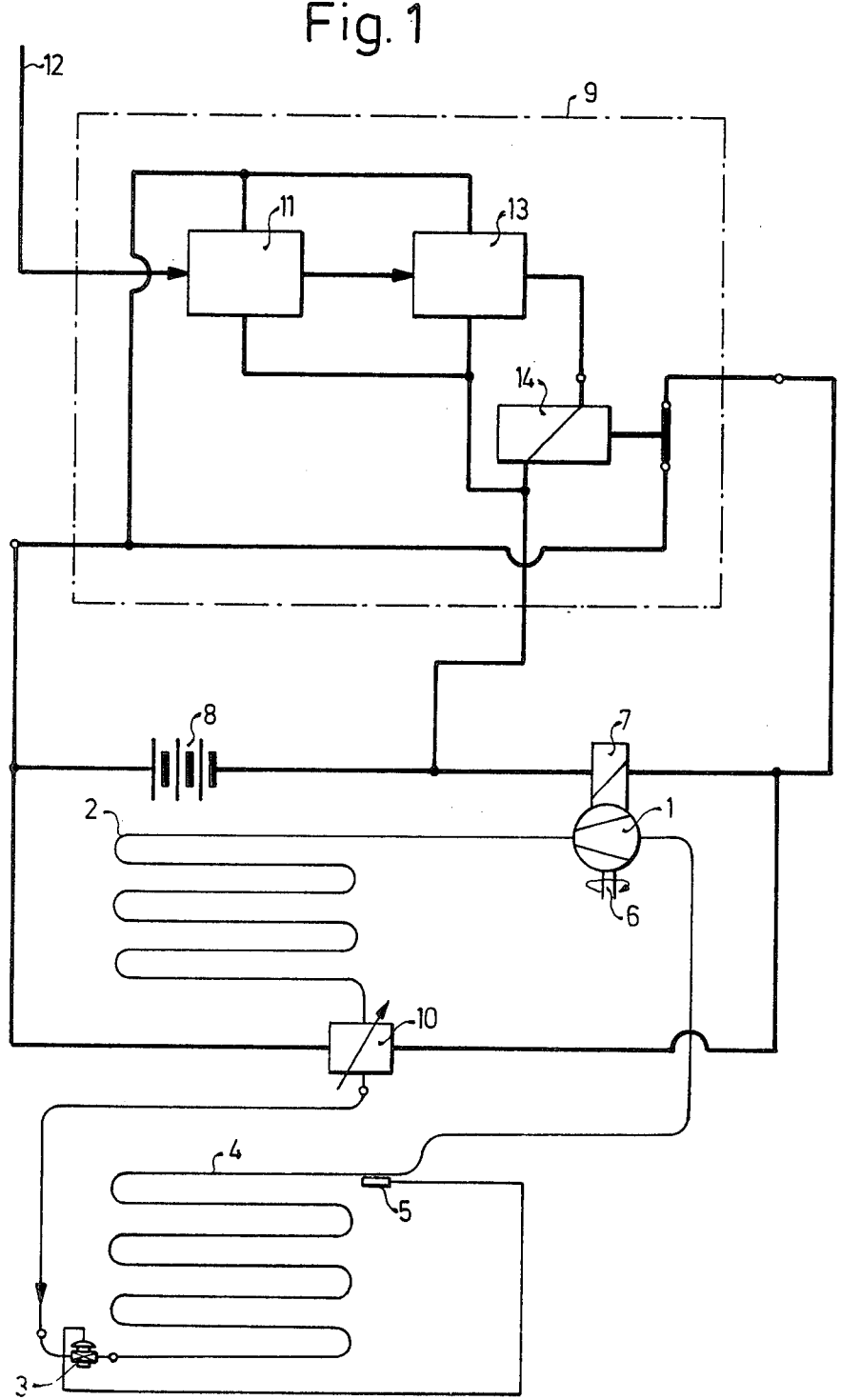
FIG. 1 is a schematic diagram of a cooling system built into an automotive vehicle for cooling the passenger compartment of the vehicle.

The cooling system depicted in FIG. 1 forms a closed circuit for the circulation of cooling medium. Arranged in this closed circuit is a cooling-medium compressor 1 the outlet side of which delivers cooling medium to a condenser 2. The outlet of the condenser 2 is in turn connected, via an expansion valve 3, to an evaporator 4. Arranged at the outlet end of evaporator 4 is a temperature sensor 5 which controls the operation of the expansion valve 3.

The cooling-medium compressor 1 is driven, via a drive shaft 6, by the non-illustrated motor or engine of the vehicle. The column of fluid pumped by the cooling medium compressor 1 per rotation thereof can be controlled by means of a control arrangement which includes an electromagnet 7. The electromagnet 7 is energized from the electrical energy supply system of the vehicle, for example the vehicle battery 8, and is controlled by an rpm-dependent relay circuit 9 connected in the current path of the electromagnet 7. In addition thereto, or as an alternative, the electromagnet 7 can be controlled by means of a pressure-responsive electrical switch 10 arranged at the outlet end of the condenser 2 in the cooling arrangement. Pressure-responsive electrical switch 10 measures the condensation pressure of the cooling medium and controls the energization of electromagnet 7 in dependence thereon.

The rpm-dependent relay circuit 9 includes a frequency-to-voltage transducer 11 provided with a control input 12. Applied to control input 12 is a control signal having the form of a train of pulses whose pulse-repetition frequency is proportional to the rpm of the vehicle engine or motor. For example, this train of pulses can be derived from the interrupter switch of the non-illustrated ignition system of the vehicle. The frequency-to-voltage transducer 11 converts this control signal into a corresponding control signal having the form of a steady-value voltage signal whose magnitude varies, for example, in direct proportion to engine rpm. This steady-value control signal is applied to and controls a threshold switch 13 (e.g., Schmitt trigger). Threshold switch 13, in turn, controls the energization of the relay winding of a relay 14. The relay switch of relay 14 is connected directly in the current path of electromagnet 7.

The cooling system operates in the following manner:

The cooling-medium compressor 1, driven via the drive shaft 6, sucks evaporated cooling medium from the outlet end of evaporator 4, and compresses and thereby warms the cooling medium. The warmed cooling medium is cooled and condensed in the condenser 2. The now liquid cooling medium flows to the expansion valve 3 where it is discharged from the condenser 2 to the evaporator 4, its pressure decreasing from the condenser pressure valve down to the evaporator pressure valve. While at this low evaporator pressure valve, the cooling medium in the evaporator 4 evaporates by drawing heat from the ambient environment. This absorption of heat from the ambient environment upon evaporation constitutes the cooling action afforded by the cooling system. The evaporated cooling medium in evaporator 4 is then sucked back into the cooling-medium compressor 1, and the flow around the cooling-medium circuit is repeated.

The cooling system is so designed and dimensioned that, for low to middle rpm values of the vehicle engine which drives the compressor via shaft 6, it affords a normal cooling power sufficient for satisfactorily climatizing the passenger compartment of the vehicle. These low to middle rpm values of engine speed correspond to the range of engine speeds from idling to city-driving speeds. For this speed range, the per-rotation volumetric throughput of cooling-medium compressor 1 is set to the maximum value. In this condition, the electromagnet 7 is energized via the relay switch of relay 14, the switch being in the position shown in FIG. 1.

If the vehicle speed and the rpm value of the vehicle engine rise above this range, then means provided in the cooling system automatically reduces the per-rotation volumetric throughput of the compressor 1. This avoids a deterioration of the specific cooling power of the cooling system in response to the increased pressure conditions prevailing at the cooling-medium compressor 1 when it operates at high speed. Specifically, the rpm-dependent pulse train applied to control input 12 rises in frequency, resulting in a corresponding increase in the magnitude of the steady-value control voltage applied by converter 11 to threshold circuit 13. Threshold circuit 13 undergoes a change of state, and this causes the relay winding of relay 14 to become deenergized, resulting in opening of the associated relay switch. This in turn results in an interruption in the electrical circuit which includes vehicle battery 8 and electromagnet 7. In particular, the deenergization of electromagnet 7 is what causes a decrease in the per-rotation throughput volume of compressor 1, down to a value equal to about 60% of the full or maximum value.

Alternatively, the per-rotation throughput volume of the cooling medium compressor 1 can be decreased in dependence upon the cooling-medium condensation pressure as measured by the pressure-responsive electrical switch 10. If the per-rotation throughput volume of the compressor is to be controlled exclusively in dependence upon engine rpm, then switch 10 and the circuit branch containing it can be omitted.

Figure 2:
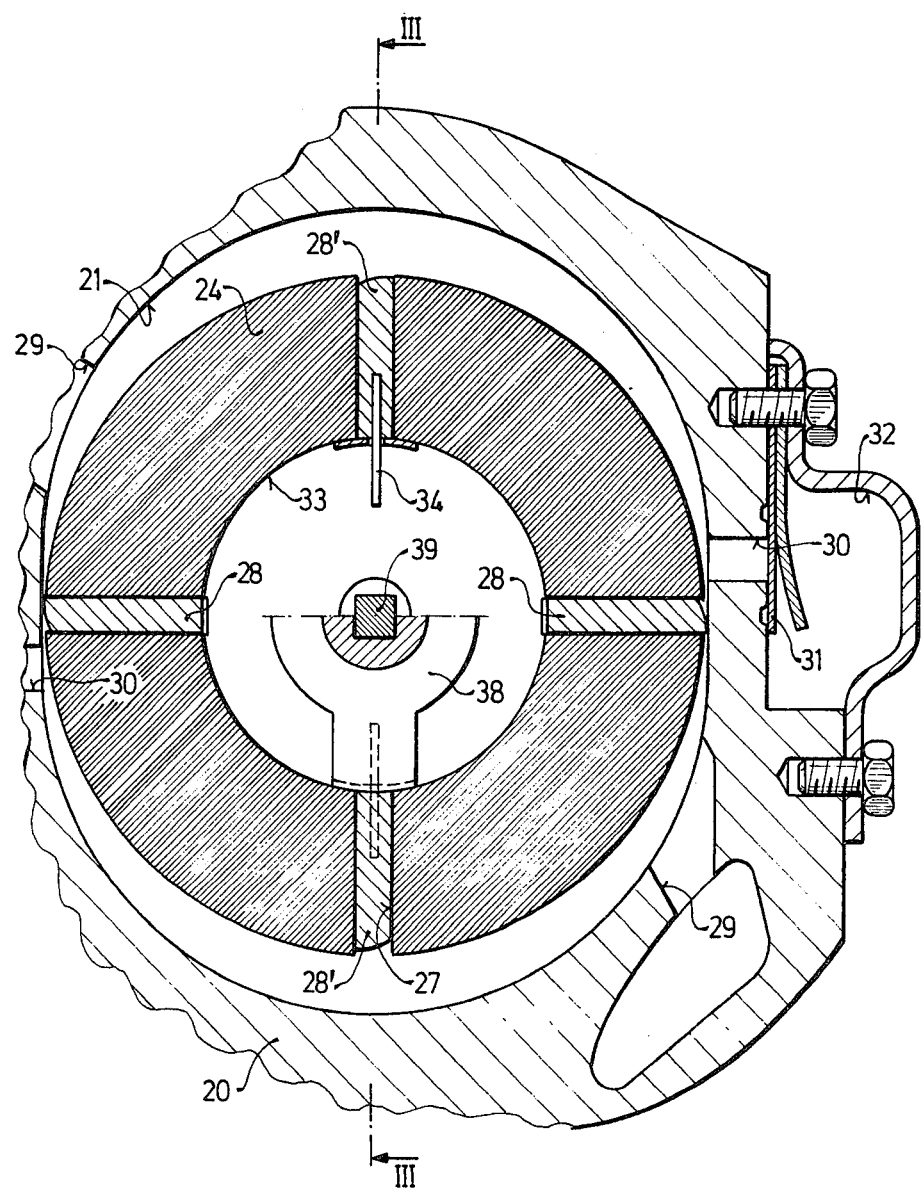
FIG. 2 is a transverse section, taken on line II—II of FIG. 3, through a cooling-medium compressor used in the cooling system of FIG. 1.
Figure 3:
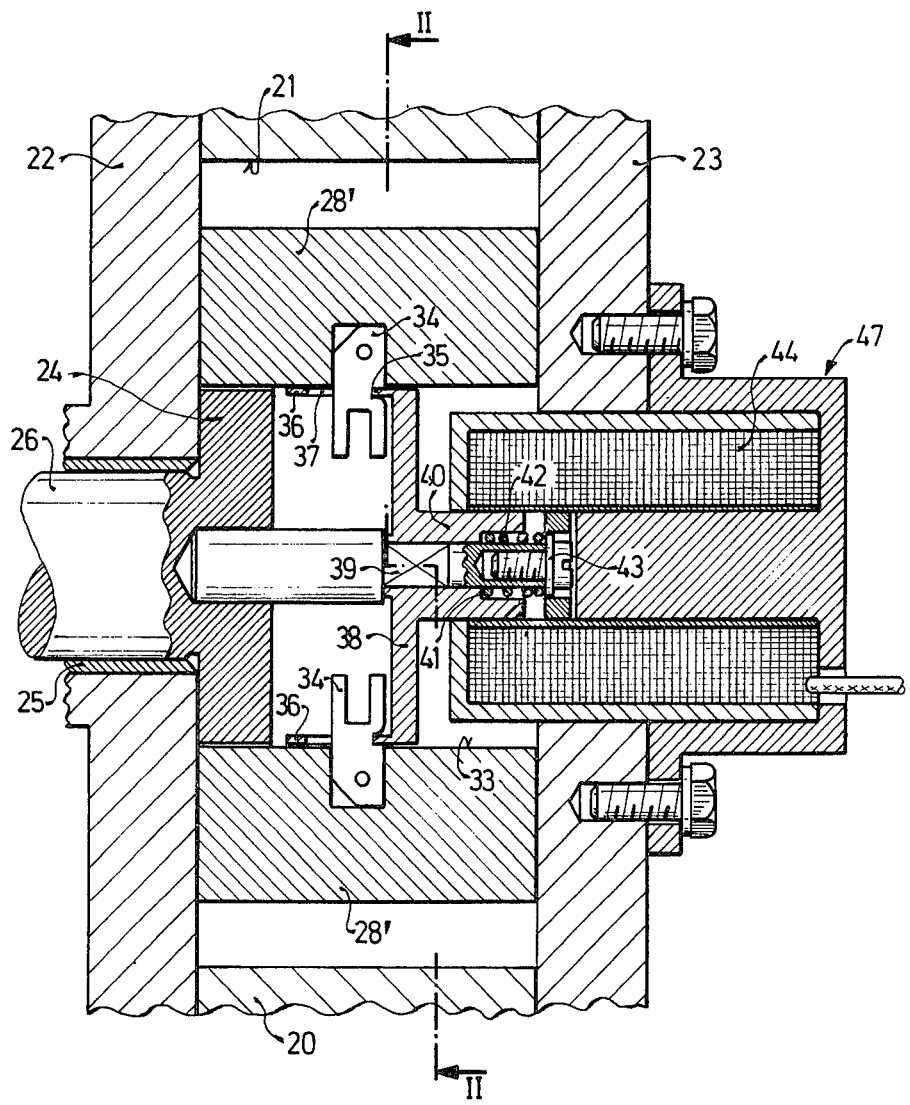
FIG. 3 is an axial section, taken on line III—III of FIG. 2, through the cooling-medium compressor used in the cooling system of FIG. 1.

FIGS. 2 and 3 depict a cooling-medium compressor which can be used as the compressor 1 in the cooling system of FIG. 1. This cooling medium compressor is of the sliding-vane type and is comprised of a housing 20 having a generally cylindrical interior chamber 21 whose axial ends are closed off by end covers 22, 23. The cylindrical inner wall of chamber 21 is of ellliptical form and serves as the control surface for the sliding vanes. Arranged in chamber 21 is a rotor 24 whose diameter is equal to the minor axis of the aforementioned ellipse, except for a small amount of play. In this way, there are defined intermediate the outer peripheral surface of rotor 24, on the one hand, and the elliptical cylindrical inner surface of chamber 21, on the other hand, two crescent-shaped working chambers.

Arranged in a central bore of the end cover 22 is an anti-friction bearing 25 in which a drive shaft 26 of rotor 24 is rotatably journalled.

Rotor 24 is provided with four radially extending slits 27 in each of which is seal-tightly but slidably guided a sliding vane 28. The radially outer edges of the vanes 28 slide along the cylindrical inner surface of housing chamber 21 and subdivide the working space into individual cells. Each of the two crescent-shaped working chambers is provided with a suction or low-pressure region and with a high-pressure region. Each suction region communicates via an inlet port 29 with a main inlet conduit for the compressor. The high-pressure region of each working space is provided with outlets 30 which communicate via flap valves 31 with the pressure or main outlet conduit of the compressor. The main inlet conduit of the compressor is connected to the outlet of the evaporator 4 (FIG. 1), whereas the pressure or main outlet conduit of the compressor is connected with a conduit leading to the condenser 2.

The rotor 24 has a coaxially arranged circular cylindrical interior space 33 which is open at the axial end of the rotor which faces away from shaft 26. The slits 27 in which the vanes 28 are guided are open at the axial ends thereof facing the interior space 33. The vanes 28', provided in two diametrally oppositely located ones of the slits 27 at their radially inner ends, are each provided with a projection 34 which extends into the interior space 33. Each projection 34 is provided with a cut-out 35 which extends parallel to the rotor rotation axis and is open at the edge of the respective projection 34. When one of the vanes 28' is fully accommodated within its associated slit 27, the respective cut-out 35 will be positioned just interiorly of the cylindrical inner wall of interior space 33.

Each cut-out 35 of a projection 34 has associated with it a respective locking member 36. The locking member 36 is mounted for axial shifting movement and slides in axial direction along the cylindrical inner wall of interior space 33.

Each locking member 36 can be axially shifted into and out of engagement with the cut-out 35 of the associated projection 34. Each locking member 36 has an axially extending guide slit 37 through which the associated projection 34 extends in radially inward direction, irrespective of whether the locking member 36 is in or out of engagement with the associated cut-out 35. Guide slit 37 serves to guide the locking member 36 for axial shifting movement relative to the associated projection 34. When one of the vanes 28' is completely accommodated within the associated slit 37, if the respective locking member 36 enters into the associated cut-out 35, then such vane 28' will be locked in that retracted position.

The locking members 36 are secured on a mounting plate 38 arranged in the interior space 33. Mounting plate 38 is mounted on shaft 26 non-rotatable relative to the shaft by means of a square key 39 arranged concentric on the shaft; however, mounting plate 38 can shift in the direction of the axis of rotor 24 along the square key 39. Connected to the central portion of mounting plate 38 is a guide sleeve 40 which likewise extends over and is guided by the square key 39. The right end of guide sleeve 40 is provided with a bore whose left end has a shoulder 41. Bearing against this shoulder 41 is one end of a compression spring 42, the other end of which bears against the washer 43 of a screw threaded into a threaded bore in the right end of the key 39. Spring 42 biases the guide sleeve 40 with the mounting plate 38 and locking members 36 secured thereon to a position in which the locking members 36, in the way described above, lock the vanes 28' in the slits 27.

An electromagnet 47 is mounted on the end cover 23 concentric with the rotation axis of rotor 24. Electromagnet 47 includes a winding 44. Guide sleeve 40 extends into the interior of winding 44. Guide sleeve 40 and mounting plate 38 together constitute the armature of the electromagnet 47. When the winding 44 is energized, the mounting plate 38 is pulled towards the electromagnet 47 against the force of spring 42, so that the locking members 36 will move out of engagement with the cut-outs 35 of the projections 34; the vanes 28' will no longer be locked in place and will be able to reciprocate in their slits 27.

The sliding-vane compressor operates as follows:

Assume that electromagnet 47 is energized. As the rotor 24 turns, the vanes 28, 28' reciprocate under the control of the inner surface of housing chamber 21 and non-illustrated biasing springs; the non-illustrated biasing springs, or the like, urge the vanes 28, 28' radially outward whereas the sliding of the radially outer edges of the vanes along the inner surface of housing chamber 21 periodically drives the vanes radially inward. As a result, the cells formed intermediate adjoining vanes increase in volume and suck in cooling medium to be compressed through the inlets 29. As the rotor turns further, each such cell decreases in volume, so that the compressed cooling medium will be discharged from the compressor through the outlets 30 and past the flap valves 31.

In the illustrated embodiment, the compressor is of double-flow construction. That is, it has two working spaces arranged point-symmetric relative to each other, and the sliding vanes in its rotor are provided in groups of two, likewise arranged point-symmetric relative to each other. This manner of construction completely relieves the rotor 24 of gas forces. This in particularly makes it possible to journal the rotor 24 at only one axial end thereof.

Next, assume that the current supply to electromagnet 47 is interrupted. Compression spring 42 pushes mounting plate 38 away from electromagnet 47. As a result, the locking members 36 will press with the rightward ends of their guide slits 37 leftwards against the rightward edges of projections 34. As soon as each sliding vane 28' moves into a position completely accommodated within the respective slit 27, the associated locking member 36 will slide leftward in axial direction into the cut-out 35 of the projection 34, thereby arresting the sliding vane 28' in retracted position.

The per-rotation volumetric throughput of the cooling-medium compressor is equal to the maximum volume attained by one cell during one rotation of the rotor, multiplied by the number of such cells, multiplied by the number of radial reciprocations performed by each vane per rotation of the rotor 24.

The volume of one cell is the volume of the space which is enclosed, ahead of an advancing vane 28, intermediate the inner wall of housing space 21 and the outer surface of rotor 24, and just separated from inlet 29. This will be explained further with regard to FIGS. 4 and 5. When electromagnet 47 is energized (FIG. 4), the forwardmost boundary of the cell volume is constituted by the leading vane. When electromagnet 47 is not energized (FIG 5), the forwardmost boundary of the cell volume is at the most constricted location 45 between the inner wall of housing chamber 21 and the outer surface of rotor 24.

Figure 4:
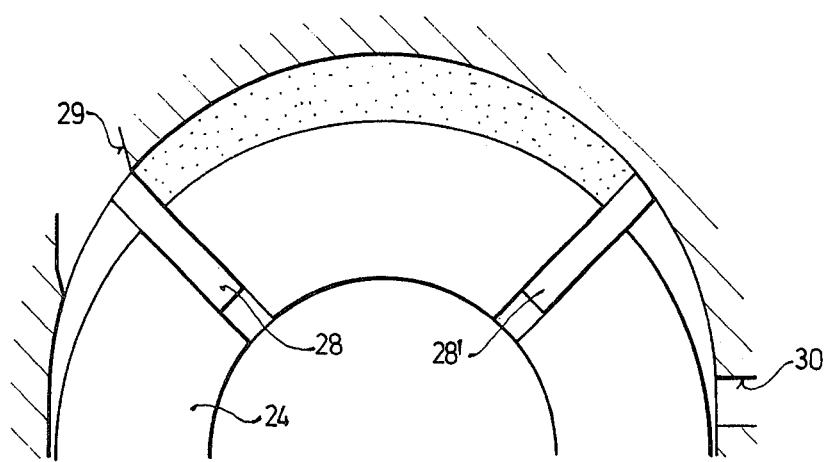
FIG. 4 depicts a portion of the compressor of FIGS. 2 and 3, showing the size of one cell when none of the vanes are arrested in retracted position.
Figure 5:
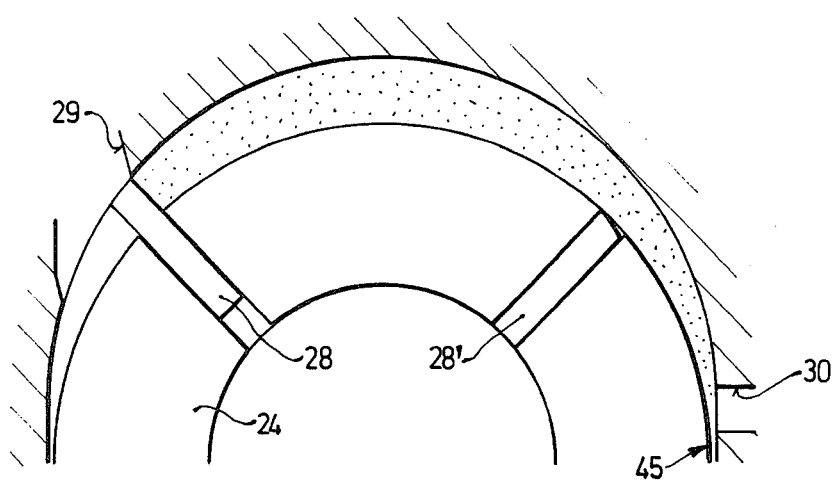
FIG. 5 is a view corresponding to FIG. 4, but showing the size of one cell when those vanes which can be arrested in their retracted positions are so arrested.

A comparison of FIGS. 4 and 5 shows the following. Locking the vanes 28' in their fully retracted position does not greatly increase the volume of one cell, but the number of cells is halved. The number of radial reciprocations performed by each vane per rotor rotation remains the same. As a result, locking of the vanes 28' in their fully retracted positions results in a very considerable reduction of the per-rotation volumetric throughput of the compressor. With a cooling-medium compressor to be used in a cooling system like that described above, the per-rotation volumetric throughput is lowered to a value equal to about 60% of the original value.

The per-rotation volumetric throughput can be lowered in this way when the sliding-vane compressor has more than two working spaces, too. For example, it may be that the compressor has $n$ working chambers arranged point-symmetrically with respect to one another relative to the rotor rotation axis. Furthermore, there will be a plurality of groups of vanes. If the gas forces exerted upon the rotor are to be brought into equilibrium, then each group of vanes should consist of $n$ vanes likewise arranged point-symmetrically with respect to one another relative to the rotor rotation axis. It is particularly advantageous that all the vanes of at least one group be capable of being locked in the retracted position, and that all the vanes of at least one other group be incapable of being locked in the retracted position. If it is not desired to establish gas-force equilibrium, then deviations from this general rule would be acceptable.

It will be understood that each of the elements described above, or two or more together, may also find a useful application in other types of circuits and constructions differing from the types described above.

While the invention has been illustrated and described as embodied in a cooling system utilizing a cooling-medium compressor of the sliding-vane type, it is not intended to be limited to the details shown, since various modifications and structural changes may be made without department in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of controlling the cooling power of the cooling system of the interior of the passenger compartment of an automotive vehicle, the cooling system being of the type including a cyclically operating cooling-medium compressor producing at low to medium engine speeds a cooling power sufficient to satisfactorily cool the interior of the passenger compartment, the method comprising the steps of using speed-measuring means to generate an engine-speed-dependent signal whose value is dependent upon engine speed; and, by applying the engine-speed-dependent signal to a volumetric-throughput adjusting means for the compressor, decreasing the cooling power of the cooling system at higher engine speeds by decreasing the per-cycle volumetric throughput of the compressor.

2. The method defined in claim 1, the adjusting means being capable of establishing only a limited number of different per-cycle volumetric through-puts for the compressor, the applying of the engine-speed-dependent signal to the adjusting means comprising decreasing the per-cycle volumetric throughput of the compressor from one value to a lower value when the engine speed rises to a predetermined value, by applying the engine-speed-dependent signal to the adjusting means through the intermediary of a signal-level detecting device.

3. The method defined in claim 1, the applying of the engine-speed-dependent signal to the adjusting means comprising decreasing the per-cycle volumetric throughput of the compressor from a first value to a second value equal to about 60% of the first value when the engine speed rises above a predetermined value, by applying the engine-speed-dependent signal to the adjusting means through the intermediary of a signal-level detecting device.

4. The method defined in claim 1, the compressor comprising a stator housing having a housing chamber defined by an interior wall, a rotor mounted for rotation in the housing chamber, the outer surface of the rotor and the interior wall of the housing together defining between themselves crescent-shaped working spaces, the rotor having a plurality of generally radially oriented guide slits, the rotor further including sliding vanes in the guide slits guided by the latter for generally radial reciprocation between radially extended and radially retracted positions within the guide slits, the sliding vanes dividing the crescent-shaped working spaces into individual cells, the applying of the engine-speed-dependent signal to a volumetric-throughput adjusting means comprising using for the adjusting means means operative for locking predetermined ones of the sliding vanes in the retracted positions thereof.

* * * * *